March 1, 1966  R. B. CRONHEIM  3,237,552
COOKING UTENSILS
Filed May 8, 1964  3 Sheets-Sheet 1

INVENTOR.
RICHARD B. CRONHEIM
BY
ATTORNEY

March 1, 1966 R. B. CRONHEIM 3,237,552
COOKING UTENSILS

Filed May 8, 1964 3 Sheets-Sheet 2

INVENTOR.
RICHARD B. CRONHEIM
BY
ATTORNEY

March 1, 1966  R. B. CRONHEIM  3,237,552
COOKING UTENSILS
Filed May 8, 1964  3 Sheets-Sheet 3

INVENTOR.
RICHARD B. CRONHEIM
BY
ATTORNEY

United States Patent Office 3,237,552
Patented Mar. 1, 1966

3,237,552
COOKING UTENSILS
Richard B. Cronheim, 411 N. 7th St., St. Louis, Mo.
Filed May 8, 1964, Ser. No. 365,908
9 Claims. (Cl. 99—340)

This invention relates in general to certain new and useful improvements in cooking utensils and, more particularly, to a multipurpose utensil which can be used for the roasting, broiling, and baking of various foods and also for enclosing cooked foods incident to carrying such foods from one locality to another.

The average housewife frequently has occasion to roast, broil, or bake moderately large quantities of meat or other similar food products. Very often, in the case of small families, such occasions only arise when guests are being entertained. Even in the case of comparatively large families, the ordinary housewife does not have the same menu every day and, therefore, the need for large cooking utensils does not arise every day. Since large cooking utensils are expensive, require large storage space, and are difficult to clean, it is highly desirable to provide a single large cooking utensil which is suitable for many different purposes.

Another occasional need for a large cooking utensil arises when the housewife desires to have a picnic or similar outdoor meal. On some occasions, it is highly desirable to have cooking utensils which are not only large enough to meet the requirements of the occasion, but also are adapted to permit food to be transported in a convenient, efficient, and fully protected manner. This same type of requirement arises if, as, and when the housewife and her family attend so-called "pot-luck" suppers either at a friend's house or at a religious or social institution.

It is, therefore, the primary object of the present invention to provide a multipurpose cooking utensil which can be used for baking, broiling, or roasting and also can be transported from place to place in a easy convenient manner.

It is another object of the present invention to provide a multipurpose cooking utensil of the type stated which can be quickly and conveniently converted from a transportable device to a utensil suitable for broiling meat or similar foods.

It is also an object of the present invention to provide a multipurpose cooking utensil having novel coacting handle and drainage-vent means cooperatively arranged so that when the handle is in operative or so-called carrying position, the vent means will be securely closed, thereby protecting the enclosed food from external contamination and, contrariwise, when the vent means is open so as to permit drainage of food juices or the escape of steam when the utensil is being used for cooking purposes, the handle will be held out of operative position so as to avoid interference with cooking operations.

It is a further object of the present invention to provide a multipurpose cooking utensil having a cover element which is cooperatively disposed upon the lower or receptacle-forming portion of the utensil so that the utensil can be used as a covered utensil or can be used as a broiler.

It is likewise an object of the present invention to provide a multipurpose cooking utensil of the type stated which is simple in construction, economical in cost, and can be compactly stored away during periods of non-use.

With the above and other objects in view, my invention resides in the novel features of form, construction, arrangement, and combination of parts presently described and pointed out in the claims.

In the accompanying drawings (three sheets)—

Figure 1:
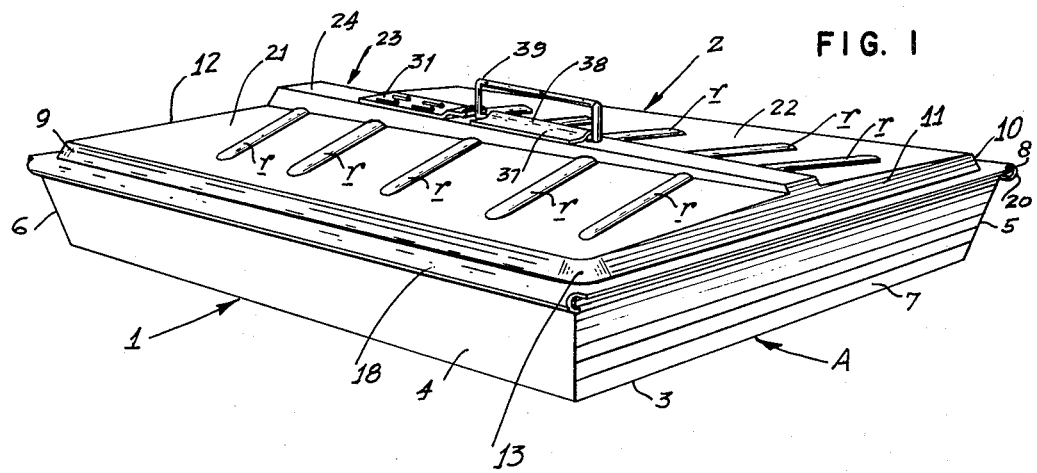
FIG. 1 is a perspective view of a multipurpose cooking utensil constructed in accordance with and embodying the present invention.

Referring now in more detail and by reference characters to the drawings, which illustrate a preferred embodiment of the present invention, A designates a multipurpose cooking utensil consisting of a bottom or receptacle-forming pan member 1 and a top or cover 2, both of which are formed by deep-drawing or any other conventional metal-forming process from pieces of sheet metal. The metal may be aluminum, sheet-iron, or stainless steel, as desired.

The pan member 1 integrally includes a flat rectilinear bottom wall 3 which is marginally curved upwardly around its periphery along short radii and merges into two side walls 4, 5, and two end walls 6, 7. The side walls 4, 5, and end walls 6, 7, are mutually provided around their upper or peripheral margins with an outwardly curled continuous rim or bead 8 which is of relatively small cross-sectional diameter. The pan member 1 is preferably of substantial depth so that it can be used for roasting, or baking with equal facility and will handle a reasonably large quantity of food.

The cover 2 is of the same rectilinear shape in horizontal cross-section as the pan member 1 and integrally includes two side walls 9, 10, and two end walls 11, 12, which are of relatively shallow, vertical height and are endwise connected to each other by quarter-circle arcuate corners 13, 14, 15, 16. Around their lower margins (reference being made to the position of the cover 2 as shown in FIG. 1), the side walls 9, 10, and end walls 11, 12, are provided with an outwardly flaring continuous flange or rim 17 which is notched at its four corners as at n and is provided along three of its four straight edges with downwardly and inwardly curled beads 18, 19, 20, the beads 18 and 20 being adapted to slide telescopically around the portions of the bead 8 which lie along the upper margins of the side walls 4, 5, and the bead 19 being adapted to fit enclosingly around the portion of the bead 8 which extends along the upper margin of the end wall 6. The uncurled or flat portion of the flange which extends outwardly from the end wall 11 of the cover 2 projects in overlying abutting engagement upon the upwardly presented face of the portion of the bead 8 which is disposed along the end wall 7 of the pan member 1. This flat portion of the flange is provided with a plurality of downwardly pressed detent ridges $d$ which spring over the proximate portions of the bead 8 and lock thereagainst to prevent unauthorized or accidental sliding movement between the pan member 1 and the cover 2.

Figure 2:
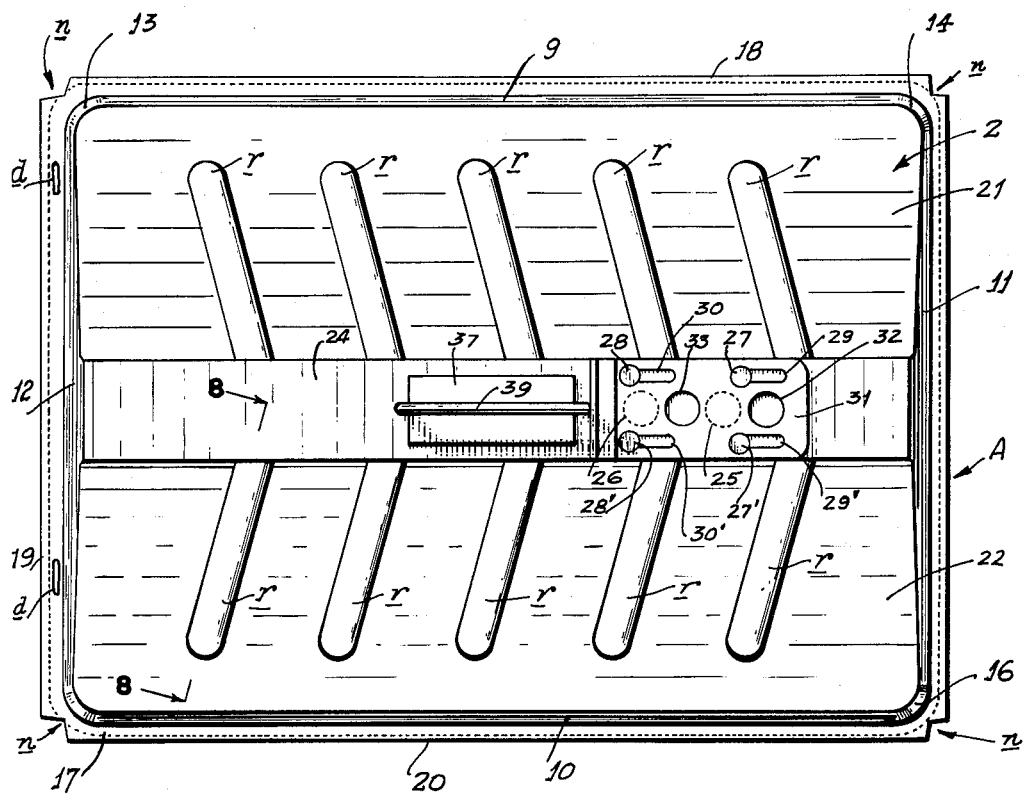
FIG. 2 is a top plan view of the cooking utensil.

The cover 2 also includes two upwardly inclined flat elements 21, 22, which are joined by a centrally disposed longitudinally extending rectilinear trough 23 having a flat rectangular top wall 24. The flat elements 21, 22, are provided with a plurality of uniformly spaced parallel laterally extending angulated ridges $r$ which are rounded at their outer ends and at their inner ends open into the trough 23, all as best seen in FIG. 2 and for purposes presently more fully appearing.

Figure 3:
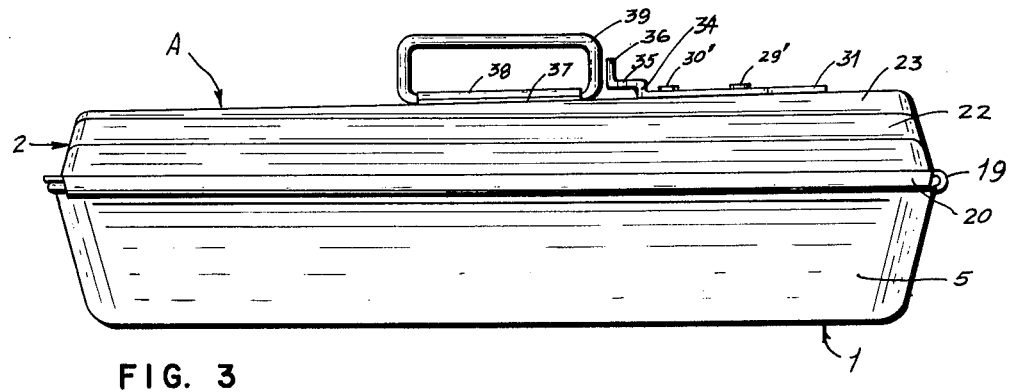
FIG. 3 is a side elevational view of the cooking utensil.
Figure 4:
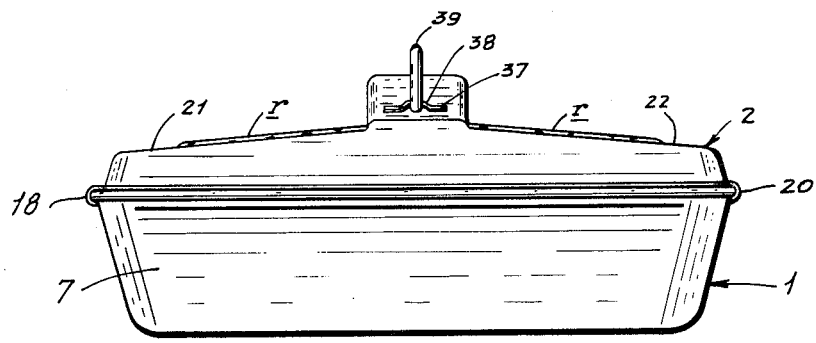
FIG. 4 is an end elevational view of the cooking utensil.

As will be seen by reference to FIGS. 1 and 3, the flat elements 21, 22, are inclined upwardly and inwardly toward the trough 23 and also upwardly and rearwardly toward the end wall 12. In other words, the end wall 12 is vertically higher than the end wall 11. On the other hand, the narrow elongated top wall 24 of the trough 23 is substantially horizontal or, in other words, is substantially parallel to the bottom wall 3 of the pan member 1 when the cover is in closure-forming position upon the pan member 1, as shown in FIG. 1. Proximate to that end of the trough 23 which has the greatest depth, the flat wall 24 is provided with a pair of circular apertures or drain holes 25, 26, and pairs of upstanding flat-headed rivets 27, 27′, and 28, 28′, which extend through pairs of elongated slots 29, 29′, 30, 30′, formed in a flat slide plate 31 which also has two apertures 32, 33, which are adapted to register respectively with the apertures 25, 26, when the plate 31 is shifted lengthwise to the left from the position shown in FIG. 2. At its left end (reference again being made to FIG. 2), the flat slide plate 31 is integrally provided with upstanding short leg-like element 34 which is, in turn, integrally provided along its upper margin with an outwardly extending flat flange 35 disposed in upwardly spaced parallel relation to the flat wall 24 and terminating in an upwardly projecting integral lip 36. The lip 36 is so arranged that it can be manually grasped with the fingers for convenient to-and-fro manipulation of the slide plate 31.

Figure 9:
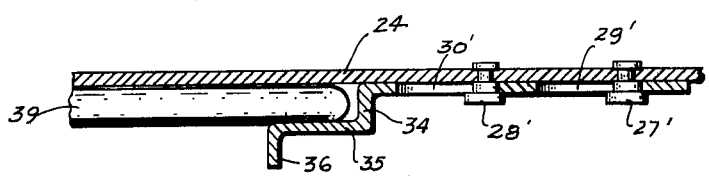
FIG. 9 is a fragmentary sectional view taken along line 9—9 of FIG. 5.

Spotwelded or otherwise rigidly secured in a centrally located position along the outer face of the flat wall 24 is a rectilinear plate 37 having an elongated central, somewhat tubular channel 38 for swingably accommodating an oblong rectangular loop-like handle 39 formed preferably of heavy gauge wire-stock or other suitable material. The handle 39 is arranged to extend straight up in so-called carrying position as shown in FIG. 1 or lie down flatwise upon the surface of the flat wall 24. The length and position of the handle 39 and the length and position of the slide plate 31 are such that when the handle 39 is in upwardly extended or carrying position, as shown in FIGS. 1 and 3, the vertical face of the lip 36 will be located proximate position to one leg of the handle 39 and the slide plate 31 will be accordingly shifted to the right (reference again being made to FIG. 2) so that the apertures 32, 33, are shifted away from registration with the apertures 25, 26. Consequently, the slide plate 31 will act as a closure across the apertures 25, 26, and may, therefore, be said to be in closed position. As will be seen by reference to FIGS. 2 and 3, when the slide plate 31 is in closed position, the handle 39 can be swung up into carrying position. On the other hand, when it is necessary to shift the closure plate to the left (reference again being made to FIG. 2), this can only be done by folding the handle 39 down into flat position to avoid abutment with the lip 36. Thereupon, the lip 36 can be manually grasped and the slide plate 31 shifted into so-called open position and, in this latter position, the flange 35 will overlie one leg of the handle substantially as shown in FIG. 9, holding the handle in collapsed or non-carrying position. It will, therefore, be evident that when the slide plate 31 is open, the handle cannot be left in carrying position. In other words, when it is desired to use the handle for carrying purposes, the slide plate 31 must be in closed position so that the utensil A will be securely closed and the food therein contained will be protected. Moreover, it should be noted that the inner engagement between the beads 18, 19, 20, and the bead 8 will cause the pan member 1 and the cover 2 to be locked securely together so that the entire utensil A can be transported by means of the handle 39.

Figure 5:
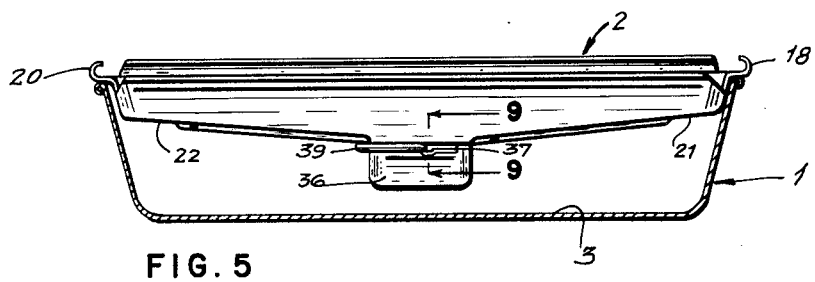
FIG. 5 is a transverse cross-sectional view of the cooking utensil showing the cover member in inverted position so that the cooking utensil can be used as a broiler.
Figure 6:
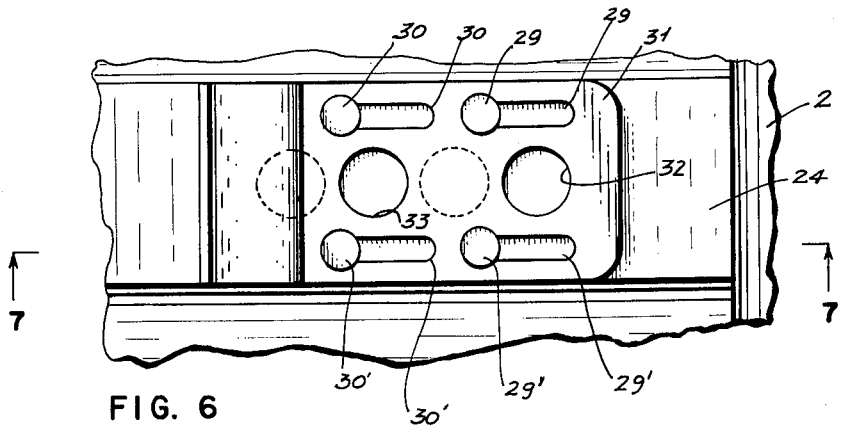
FIG. 6 is an enlarged top plan view of the venting element forming a part of the present invention.
Figure 7:
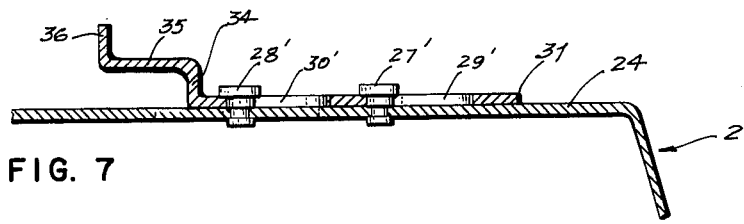
FIG. 7 is a fragmentary sectional view taken along line 7—7 of FIG. 6.
Figure 8:
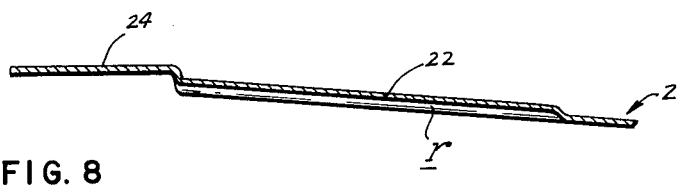
FIG. 8 is a fragmentary sectional view taken along line 8—8 of FIG. 2.

When desired, the cover 2 can be slid laterally with respect to the pan member 1 and removed therefrom. Thereupon, the handle 39 can be swung into collapsed position and the slide plate 31 pulled over to the position shown in FIG. 9, that is to say, into open position. The cover 2 may then be turned upside down and placed within the upper portion of the pan member 1, substantially in the manner shown in FIG. 5, thereby forming a broiler having bottom walls which are appropriately inclined for drainage of all meat juices and drippings through the apertures 25, 26, and the pan member 1 will act as a catch pan therefor. By reason of the fact that the handle 39 is held in collapsed position when the slide plate 31 is in open position, the handle 39 will be held up out of the way when the utensil A is being used as a broiler. It is, of course, obvious that the lateral angulated ridges $r$ will act as drain gutters to facilitate the downward flow of meatjuices and drippings.

It should be understood that changes and modifications in the form, construction, arrangement, and combination of the several parts of the cooking utensils may be made and substituted for those herein shown and described without departing from the nature and principle of my invention.

Having thus described my invention, what I claim and desire to secure by Letters Patent is:

1. A culinary utensil comprising a pan-like bottom member having an upwardly presented opening, a top member shaped to fit closure-wise across the upwardly presented opening of the bottom member, said top member having means for optional locking engagement with the upper marginal portion of the bottom member whereby the bottom member and top member are securely connected together, handle means mounted upon the top member and being adapted to be moved optionally from a carrying position to a collapsed position, said top member being of such shape and contour as also to fit in upside down position within and across the top of the bottom member, said handle being adapted to be moved into the collapsed position when the top member is in said upside down position, said top member being provided with vent openings, and closure means for optionally covering the vent openings, said closure means being positioned for optionally interlocking with the handle in such a manner that, when the handle is up in carrying position, the closure means must be in vent-covering position, and, conversely, when the handle is in collapsed position, the closure means can be moved into non-covering relation to the vent openings.

2. A culinary utensil comprising a pan-like bottom member having an upwardly presented opening, a top member shaped to fit closure-wise across the upwardly presented opening of the bottom member, handle means mounted upon the top member and being adapted to be moved optionally from a carrying position to a collapsed position, said top member being provided with vent openings, and closure means for optionally covering the vent openings, said closure means being positioned for optionally interlocking with the handle in such a manner that when the handle is up in carrying position, said closure means must be in vent-covering position, and, conversely, when the handle is in collapsed position, said closure means can be moved into non-covering relation to the vent openings.

3. A culinary utensil comprising a pan-like bottom member having an upwardly presented opening, a top member shaped to fit closure-wise across the upwardly presented opening of the bottom member, means for optionally engaging the bottom member and the top member securely together, handle means mounted upon the top member and being adapted to be moved optionally between upward or carrying position and downward or collapsed position, a slide member mounted on said top member adjacent said handle means and adapted for movement toward and away from said handle means, a lock element carried on said slide member being adapted to register in overlying, surface-abutting relationship with respect to said handle means when same is in collapsed position, whereby when said slide member is moved toward said handle means when the latter is in collapsed position, said handle means is received between said lock element and said top member and being locked therebetween against inadvertent movement to upward position.

4. A culinary utensil comprising a pan-like bottom member having an upwardly presented opening, a top member shaped to fit closure-wise across the upwardly presented opening of the bottom member, means for optionally engaging the bottom member and the top member securely together, handle means mounted upon the top member and being adapted to be moved optionally between upward or carrying position and downward or collapsed position, a slide member mounted on said top member adjacent said handle means and adapted for movement toward and away from said handle means, stop means provided on said slide member engaging said handle means when the latter is in upward or carrying position to prevent travel of said slide member, an angle latch carried on said slide member and being spaced above said top member to a height slightly greater than the height of said handle means when in collapsed position whereby with said slide member moved toward said handle means and the latter in collapsed position, said handle means is received between said latch and said top member and thereby locked against inadvertent movement to upward position.

5. A culinary utensil as defined in claim 4 and further characterized by said stop means comprising a leg member mounted on said latch, said leg member being in normal relationship to said top member.

6. A culinary utensil comprising a pan-like bottom member having an upwardly presented opening, a top member shaped to fit closure-wise across the upwardly presented opening of the bottom member and having vent openings, means for optionally engaging the bottom member and top member together, a rectangular strip mounted centrally of said top member, a handle swingably mounted on said strip for optional movement between vertical or carrying position and horizontal or collapsed position, a flat slide plate having apertures for registration with the vent openings of said top member, said slide plate being mounted on said strip adjacent said handle for movement axially of said strip toward and away from said handle, a leg element integrally provided on said slide plate and extending vertically therefrom in normal relationship to said strip, a horizontal flange projecting from said leg member toward said handle in upwardly spaced, axially parallel relationship of said strip and a stop lip extending upwardly from the portion of said flange remote from said leg for engaging said handle when the latter is in carrying position wherein said top member vent openings and said plate apertures will be out of registration, and said flange member being engageable with said handle when in collapsed position wherein said handle is maintained against inadvertent upward movement and said vent openings and apertures are in registration.

7. A culinary utensil comprising a pan-like bottom member having an upwardly presented opening, a top member shaped to fit closure-wise across the upwardly presented opening of the bottom member, means for optionally engaging the bottom member and the top member securely together, handle means mounted upon the top member and being adapted to be moved optionally between upward or carrying position and downward or collapsed position, a slide member mounted on said top member adjacent said handle means and adapted for movement toward and away from said handle means, an angle latch carried on said slide member and being spaced above said top member to a height slightly greater than the height of said handle means when in collapsed position, said top member having vent openings, said slide member having apertures for registration with said vent openings when said handle means are locked by said latch in collapsed position whereby with said slide member moved toward said handle means and the latter in collapsed position said handle means is received between said latch and said top member and thereby locked against inadvertent movement to upward position.

8. A culinary utensil comprising a pan-like bottom member having an upwardly presented opening, a top member shaped to fit closure-wise across the upwardly presented opening of the bottom member, said top member having means for optional locking engagement with the upper marginal portion of the bottom member whereby the bottom member and top member are securely connected together, handle means mounted centrally upon the top member and being adapted to be moved optionally from a carrying position to a collapsed position and a slideable lock element adapted for movement into overlying, registering, surface-abutting relationship with respect to said handle means when the latter is in collapsed position for maintaining same in such condition.

9. A culinary utensil comprising a pan-like bottom member having an upwardly presented opening, a top member shaped to fit closure-wise across the upwardly presented opening of the bottom member, said top member having means for optional locking engagement with the upper marginal portion of the bottom member whereby the bottom member and top member are securely connected together, handle means mounted upon the top member and being adapted to be moved optionally from a carrying position to a collapsed position, a slideable lock element adapted for movement into overlying, registering, surface-abutting relationship with respect to said handle means when the latter is in collapsed position for maintaining same in such condition, said top member being of such shape and contour as also to fit in upside down position within and across the top of the bottom member, said handle being adapted to be moved and locked into the collapsed position when the top member is in said upside down position.

References Cited by the Examiner

UNITED STATES PATENTS

| | | | |
|---|---|---|---|
| 448,548 | 3/1891 | Schifferly | 220—41 |
| 2,204,681 | 6/1940 | Kircher | 99—340 |
| 2,379,970 | 7/1945 | Koebel | 292—207 |
| 2,463,586 | 3/1949 | Anderson | 220—41 |
| 2,472,582 | 6/1949 | Green | 220—41 |
| 2,559,681 | 7/1951 | Senseman. | |
| 2,777,570 | 1/1957 | Mytinger | 220—41 X |
| 3,028,802 | 4/1962 | Schneider | 99—340 X |
| 3,049,224 | 8/1962 | Fredette et al. | 220—41 |

FOREIGN PATENTS 615,022   12/1948   Great Britain.

WALTER A. SCHEEL, *Primary Examiner.*

BILLY J. WILHITE, *Examiner.*